United States Patent [19]

Schwarzkopf

[11] Patent Number: 4,642,043

[45] Date of Patent: Feb. 10, 1987

[54] DEVICE FOR THE ELECTRIC HEATING AND FLUID COOLING OF AN INJECTION-MOLDING MACHINE NOZZLE

[75] Inventor: Eugen Schwarzkopf, Lüdenscheid, Fed. Rep. of Germany

[73] Assignee: Hotset Heizpatronen und Zubehör GmbH, Lüdenscheid, Fed. Rep. of Germany

[21] Appl. No.: 627,802

[22] Filed: Jul. 5, 1984

[30] Foreign Application Priority Data

Jul. 9, 1983 [DE] Fed. Rep. of Germany ....... 3324901

[51] Int. Cl.[4] ............................................. B29C 45/78
[52] U.S. Cl. ............................... 425/547; 264/328.15; 425/143; 425/549
[58] Field of Search ........... 425/547, 549, 384, 378 R, 425/379 R, 143, 144, 562; 264/328.15, 40.6; 219/301, 421, 530, 540

[56] References Cited

U.S. PATENT DOCUMENTS 4,080,726  3/1978  Neimanns et al. .................. 219/540

FOREIGN PATENT DOCUMENTS

| 240503 | 6/1960 | Australia | 264/328.15 |
| 43234 | 1/1982 | European Pat. Off. | 425/549 |
| 1236178 | 3/1967 | Fed. Rep. of Germany . | |
| 2347987 | 11/1976 | Fed. Rep. of Germany . | |
| 3001017 | 7/1981 | Fed. Rep. of Germany | 425/549 |
| 2109296 | 6/1983 | United Kingdom | 425/549 |
| 2110980 | 6/1983 | United Kingdom | 425/549 |

Primary Examiner—Jay H. Woo
Assistant Examiner—Timothy W. Heitbrink
Attorney, Agent, or Firm—Karl F. Ross; Herbert Dubno

[57] ABSTRACT

A heating and cooling jacket for the distributor of a injection-molding machine comprises tubular inner and outer sleeves and possibly an intermediate sleeve which defines compartments filled with a high-density particle compacted mass around the cooling tube turns which hug the inner sleeve and electric heater turns which hug the intermediate sleeve.

9 Claims, 5 Drawing Figures

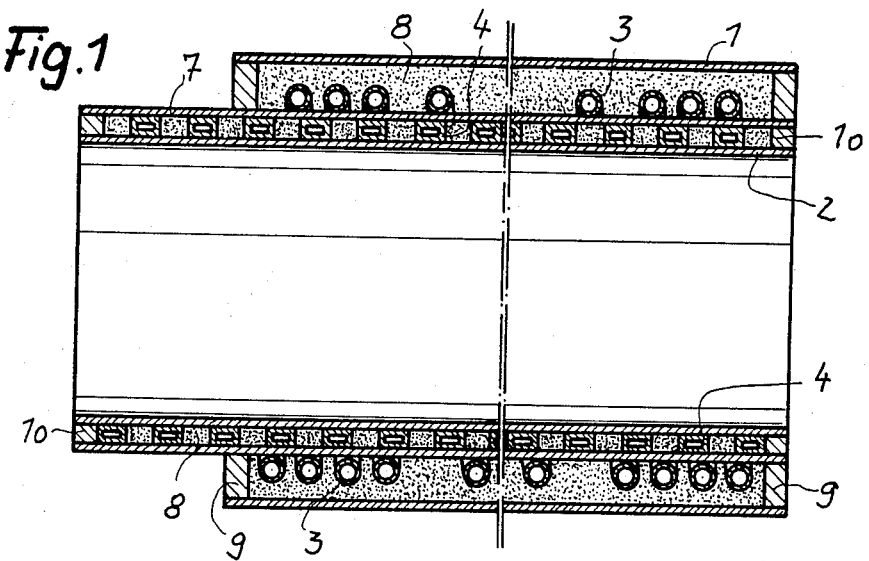
Fig.1
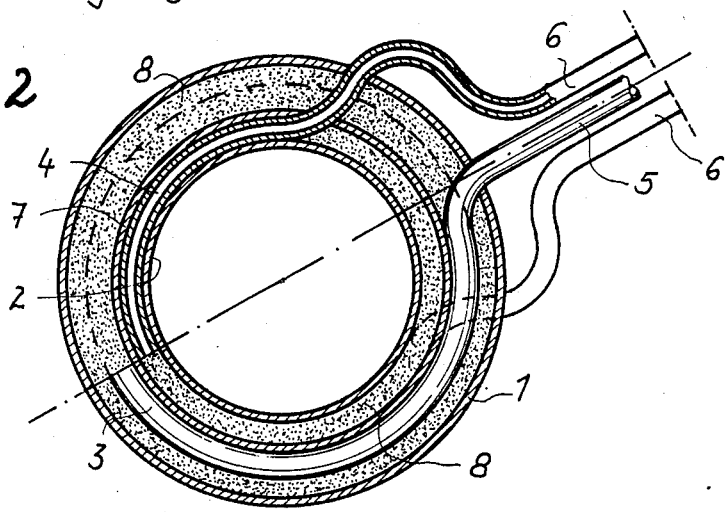
Fig.2
Fig.3
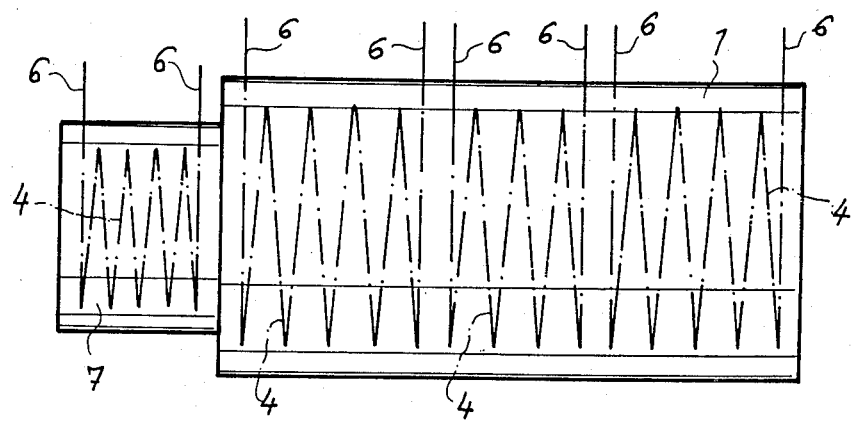

DEVICE FOR THE ELECTRIC HEATING AND FLUID COOLING OF AN INJECTION-MOLDING MACHINE NOZZLE

FIELD OF THE INVENTION

My present invention relates to a unit adapted to provide electric heating and fluid cooling in the handling of thermoplastic synthetic resin materials and, more particularly, to a jacket adapted to surround the injection nozzle bushing of an injection-molding machine and to provide electric heating and fluid cooling selectively for such a nozzle.

BACKGROUND OF THE INVENTION

A device for the electric heating and cooling of a fluid medium, in synthetic resin processing machines and especially injection-molding machines, and particularly in association with the mold-filling sleeve of the nozzle thereof, is known.

This sleeve or nozzle generally comprises an axially extending passage upon which radial passages communicate with the respective parts of the mold. The device includes an electric heater and at least one coolant tube in a common carrier or jacket extending around the bushing. The jacket is composed of a highly thermally conductive material and the heater and cooling tube are embedded therein with the cooling tube being located somewhat more closely to the synthetic resin flow passage than the electric heater.

A device of this type is described, for example, in German Patent No. 23 47 987. The jacket comprises form-fitting parts surrounding the cylinder through which the synthetic resin material is displaced, i.e. jacket segments, whose inner curvature corresponds to the outer curvature of the cylinder against which the segments are seated.

This device can be applied to the cylinder of an injection-molding machine so that, during the processing of the thermoplastic material, any overheating which can result from friction heat during the working of the plastic material can be prevented by the cooling fluid and any lack of heating be made up by the electric heater.

This device, however, is relatively complex and expensive, at least in part as a result of its two-part construction.

Indeed, the fabrication of the device is expensive and may result in unreliable units because of the difficulty in holding the electric and cooling tube parts in appropriate relative positions during the production of the jacket segments.

Because of the fabrication methods used, i.e. casting of the bed of the jacket segments around the previously positioned tube and heater, relatively large wall thicknesses must be provided and hence, upside in those regions in which the injection-molding machines may experience the greatest coil heat development in the synthetic resin material, a thermal inertia because of such large wall thicknesses may preclude satisfactory cooling. Consequently, where the danger of overheating is the greatest, the units may be least responsive because, at least in part, of the gaps between the two units and the regions which must be traversed by bolts or the like to clamp the segments onto the cylinder.

OBJECTS OF THE INVENTION

It is the principal object of the present invention to provide an improved electric heating and fluid cooling device for a synthetic-resin-processing machine and particularly an injection-molding machine, whereby the afore-mentioned disadvantages are obviated.

Another object of my invention is to provide a device for the purposes described which can be provided directly around the distributor or nozzle of an injection-molding machine and can control the temperature of the synthetic resin material so as to prevent overheating without the thermal inertia and like drawbacks in the regions most sensitive to overheating.

Another object of this invention is to provide a combined heating and cooling unit for the purposes described which allow narrow working temperature tolerances to be maintained without difficulty so that thermoplastic synthetic resins which have very narrow operating temperature ranges, e.g. thermoplastic elastomers whose processing temperature generally cannot deviate by more than 10° C. from the optimal value, can be handled without difficulty.

The invention also has as its object to provide an improved injection-molding machine which can be operated within narrow temperature tolerances, at least in the region of the thermoplastic distributor communicating within the mold cavities.

Yet a further object of this invention is to provide an improved electric heating and cooling fluid jacket which is of lower cost and simplified construction so that its fabrication can be facilitated.

SUMMARY OF THE INVENTION

These objects and others which will become apparent hereinafter are attained, in accordance with the present invention, in an electric heating and fluid-cooling unit adapted to surround the cylindrical distributor of an injection-molding machine discharging into the mold cavities and comprising an outer circumferentially closed, circular metallic prefabricated outer sleeve of a relatively large diameter within which is provided a coaxial circumferentially closed prefabricated metallic inner sleeve coaxial with the outer sleeve and defining an annular gap therewith. This gap is closed at its ends to form an annular compartment. According to the invention the electric heater coils and the cooling tube coils are each helically provided around this inner sleeve and within this clearance or compartment so that the cooling tubes lie directly against and in contact with the inner sleeve while the remainder of the compartment is filled with a granular and/or pulverulent heat-conductive medium in highly compacted form.

This arrangement allows at least the inner sleeve to be of extremely small wall thickness and, moreover, enables the selection from the materials from which the device is constituted to be simplified while ensuring maximum heat transformation of the synthetic resin material.

More particularly, the coolant tubes, the material packed therearound and even the inner sleeve can be comprised of the same material and can have the same melting point without fabrication problems.

The device of the invention can also be fabricated more simply than the prior art devices. This is especially the case when the outer sleeve is composed of steel and especially a noncorroding (stainless) steel, which can be provided along its inner surface with a heat-reflective coating and can be polished along the inner surface to be heat-reflective, the inner sleeve is composed of copper and the granular and/or pulverulent substance is at least predominantly copper. When the term "granular" is used hereinafter, I intend to denote particles which can be filled into the compartment and compacted at a high density therein as in powder metallurgy, regardless of the size of the particles and thus to include particle sizes ranging from dusts in the micron particle size range to grains in, say, the millimeter size range.

With this system, spurious heat radiation outwardly can be significantly reduced without requiring additional insulating or reflective means. The carrier rings which move the outer sleeve on the inner sleeve and close the compartment at least in part, can also be formed of the same material as the packing, e.g. copper.

In the prior art, where smaller rings are provided, they are generally composed of light metal and thus are less effective for the direct conduction of the element to be heated or cooled and hence the direct heat transfer is improved in the case of the present invention.

The end closures, therefore, for the compartment are preferably tightly fitted in the steps provided between the sleeves and can be press-fitted or bonded therein.

The coolant tubes advantageously are of polygonal cross section so that they have surfaces lying in contact with at least the inner sleeve.

In a preferred embodiment of the invention the coolant tubes can have the external configuration of rectangles with the cross section elongated in the axial direction of the inner tube, i.e. along a generatrix thereof. One of the longer sets of the rectangular profiles can therefore lie directly against the inner sleeve.

To minimize non-homogeneity of the granular or pulverulent filling during compaction by the application of external pressure without deforming the inner sleeve to improve the thermal characteristics of the jacket and minimize the need for internal machining to bring about a given internal diameter, I may provide between the inner and outer sleeves or shells at least one intermediate sleeve defining compartments respectively with the outer sleeve and the inner sleeve.

According to this aspect of the invention, the diameter of the intermediate sleeve may be greater than that of the inner sleeve by at least twice the thickness of the cooling tubes, i.e. just as the cooling tubes hug the inner sleeve, the intermediate sleeve may closely surround the helical turns of the cooling tubes and be in heat-exchanging relationship therewith. The resulting inner compartment is closed at its ends and provided with granular or pulvurulent fillings. Furthermore, the helical turns of the electric heater can be wound directly upon the intermediate sleeve and lie in direct contact therewith. When the annular outer compartment which is closed at its end is filled with the granular or pulvurulent heat-conductive material, or when the latter is in a highly compacted state, the outer dimension of the jacket can be minimized and the compaction can be effected by compressing the filling by the application of pressure to the jacket inwardly.

Because the electric heater is in direct contact with the intermediate thermally conductive sleeve and the latter bears against the cooling coil which, in turn, bears against the thin inner conductive sleeve, the heat flow paths to the nozzle or distributor are minimized.

It has been found to be advantageous when the ends of the intermediate sleeve are bonded to the ends of one of the other sleeves, e.g. through a sealing ring which is thermally conductive in the manner described and the ends of the sleeves are flush at least at one end of the jacket. This greatly simplifies construction.

The intermediate sleeve is preferably comprised at least predominantly of copper for low thermal inertia and fast heating and cooling reaction.

Preferably when the jacket is applied to the distributor of an injection-molding machine having at least one and preferably a plurality of axial bores and radially directed nozzles and which must be operated with very small temperature tolerances because of the sensitivity of the synthetic resin material, it has been found to be advantageous to extend the intermediate inner sleeve and one end of the jacket beyond the outer sleeve so that the cooling zone projects beyond the end of the heating zone and thereby any danger of overheating at a critical point along the distributor can be avoided. This also greatly simplifies the fabrication and reduces the manufacturing cost.

At at least one end the inner sleeve and the intermediate sleeve can be formed with a hollow flange, the interior of which communicates with the annular compartment defined therebetween and receives the highly compacted pulvurulent or granular heat-conductive substances and a cooling tube embedded therein.

BRIEF DESCRIPTION OF THE DRAWING

The above and other objects, features and advantages of the present invention will become more readily apparent from the following description, reference being made to the accompanying drawing, in which:

FIG. 1 is an axial cross-sectional view of a heating and cooling jacket for use in an injection-molding machine according to the invention;

FIG. 2 is a transverse section through this jacket;

FIG. 3 is a diagram representing an elevational view and showing another arrangement of the cooling tubes of the jacket;

SPECIFIC DESCRIPTION

Figure 5:
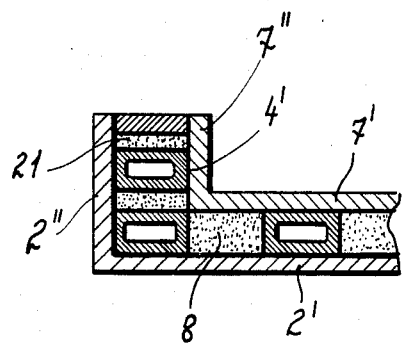
FIG. 5 is a detail view illustrating a flange at an end of the jacket which can be provided on the jacket otherwise as constructed in FIG. 1.

The jacket of the present invention comprises an outer cylindrical shell or sleeve which is circumferentially closed and composed of metal, preferably stainless steel. Within this sleeve 1 an inner sleeve 2 composed of copper is coaxially provided, the sleeve 2 being similarly cylindrical and prefabricated and circumferentially closed.

While the invention is applicable also to systems operating without an intermediate sleeve, in the preferred and best mode embodiment of the invention, an intermediate sleeve 7 which is likewise cylindrical and coaxial with the outer sleeves and comprised of copper, is provided.

In the annular space between the sleeves 1 and 2, coils 4 or a cooling-fluid tube and coils 3 of an electric resin heater are provided in generally helical turns.

The outer and inner sleeves 1 and 2, respectively, are tube sections. The electric heater 3 and the cooling tube 4 are provided with corresponding service lines such as the conductors and the feed and discharge tube stretches 6 which can be led from the jacket to an end thereof, or radially by the heating coil 3 and the tube coil 4, can be divided into sections along the length of the jacket 3 as has been shown diagrammatically in FIG. 3.

In the annular compartment between the inner sleeve 2 and the intermediate sleeve 7, the coil 4 is provided so that it lies flatly against both of these sleeves and at this end has a rectangular cross section, being somewhat elongated parallel to the axis of the jacket and to the common axis of the sleeve, i.e. parallel to the sleeve generatrices. The heating coil 3 has turns of circular cross section and may be provided with any conventional heat-resisting element (not especially shown) and lies against the intermediate sleeve 7.

Both of the annular compartments are filled with the afore-mentioned granular and/or pulverulent high thermal powder which is highly compacted and has been represented at 8. This powder is composed of copper and is in a closely packed state so as to be practically free from interstitial spaces or gaps.

The ends of the annular compartment are closed by rings 9 and 10 of copper which are of internal and external diameters corresponding to the diameters of the sleeves between which they are fitted and are force-fitted in place and/or shrink-fitted and, if desired, even welded in place.

In addition to subdividing the turns of the heater or cooler in the manner shown in FIG. 3, the pitch of the turns can be varied as shown for the heater 3 in FIG. 1 to intensify the heating or cooling effected at any desired location or to reduce the heating and cooling effects.

Figure 4:
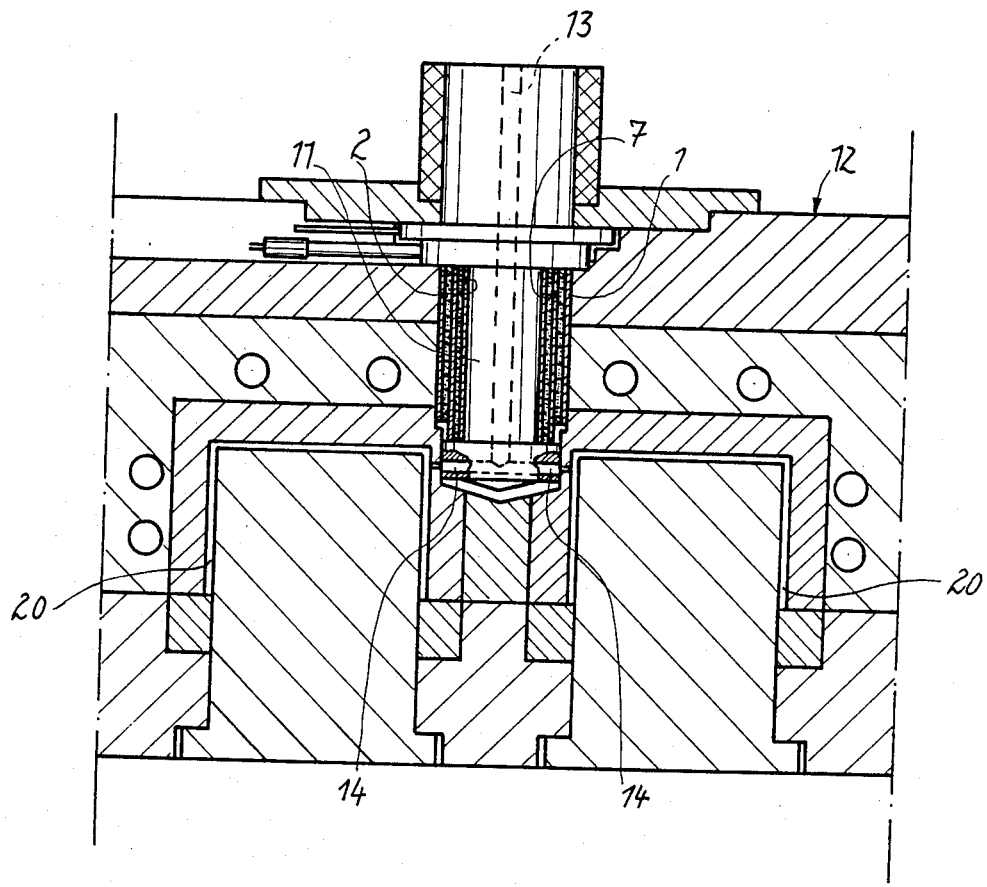
FIG. 4 is an axial section through a portion of the injection-molding machine provided with this jacket.

While at one end, i.e. the right-hand end of FIG. 1, the sleeves terminate flush with one another, it has been found to be advantageous to extend the intermediate sleeve 7 and the inner sleeve 2 to the opposite axial end beyond the outer sleeve 1 (see FIGS. 1, 3 and 4). The jacket of the invention is varied to surround the distributor sleeve or nozzle.

Of the injection-molding machine, this sleeve 11 is generally disposed in the injection mold 12 and is sealingly mounted therein to be surrounded by the jacket as has been illustrated. The sleeve 11 has one or more axially extending passages 13 and terminates in radial nozzles 14 in a flanged member which directs the axially oncoming thermoplastic radially outwardly into respective mold cavities 20. The reduced diameter end of the stepped diameter jacket can abut this flange. Alternatively, the inner sleeve 2' and the intermediate sleeve 7' (FIG. 5) can be formed with flanged portions 2" and 7" which can lie against a shoulder of the nozzle and can define a radial compartment 21 which can extend the annular compartment between these sleeves and can be formed with one or more spiral turns 4' of the cooling fluid tube. The cooling in the region of the outward direction of the thermoplastic jets can thus be more intense to prevent the danger of overheating in this region in which such overheating because of frictional heat is most to be feared. The electric heating in the jacket of the invention preferably utilizes a tubular heater provided with the resistance heating element as described.

The cooling tube turns 4 have a rectangular tube profile so oriented that along a long side of the rectangle it abuts the inner sleeve 2 and the intermediate sleeve 7 in flat contact. The cooling tube turns 4 are also preferably composed of copper.

The construction shown in FIG. 5 has been found to be particularly advantageous when the nozzle is of the plate type, so that the flanges, which are also filled with the highly compacted granular or pulverulent mass 8, can lie against the face of the plate turned toward the jacket.

The fuel coolant can be an oil having its boiling point above the maximum working temperature of the synthetic resin which is preferably a synthetic marketed under the name DESMOPAN by BAYER of Leverkusen, West Germany, and has a relatively narrow working temperature range with a minimum temperature of about 230° C. and a maximum temperature of about 245° C. (see German Patent No. 23 47 987).

I claim:
1. A heating and cooling jacket for synthetic resin distributor for an injection molding machine, comprising:
    a cylindrical circumferentially closed one-piece prefabricated outer metal sleeve;
    a cylindrical, circumferentially closed prefabricated intermediate metal sleeve coaxial with and disposed within said outer metal sleeve and radially spaced therefrom to define an outer annular compartment between said inner and outer metal sleeves;
    a cylindrical, circumferentially closed prefabricated inner metal sleeve coaxial with and disposed within said intermediate metal sleeve and radially spaced therefrom to define an inner annular compartment between said inner metal sleeve and said intermediate metal sleeve;
    means for closing said inner and outer annular compartments at opposite axial ends thereof;
    a cooling coil having a multiplicity of cooling-tube turns of flattened cross-section lying against said intermediate metal sleeve and against said inner metal sleeve within said inner annular compartment, at least some of said inner turns being separate from one another by interturn spaces;
    an electric heater having a plurality of helical turns in spaced apart relationship in said outer annular compartment and in contact with said intermediate metal sleeve;
    a first means of densely packed heat-conductive metal particles filling said outer annular compartment and spaces between the turns of said heater between said outer metal sleeve and a second mass of high conductivity densely-packed metal particles filling said inner annular compartment between said inner metal sleeve and said intermediate metal sleeve and the spaces between the cooling-tube turns of said cooling coil.

2. The heating and cooling jacket defined in claim 1 wherein said outer metal sleeve is composed of stainless steel having a heat-reflective inner surface.

3. The heating and cooling jacket defined in claim 2 wherein said inner metal sleeve is composed of copper.

4. The heating and cooling jacket defined in claim 3 wherein the means closing the ends of said inner and outer annular compartments are rings.

5. The heating and cooling jacket defined in claim 3 wherein said heat-conductive metal particles are composed of copper.

6. The heating and cooling jacket defined in claim 5 wherein said cooling tube turns are of rectangular cross-section.

7. The heating and cooling jacket defined in claim 6 wherein said intermediate metal sleeve is composed of copper.

8. The heating and cooling jacket defined in claim 7 wherein said intermediate metal sleeve and said inner metal sleeve project at one end of said heating and cooling jacket axially beyond said outer metal sleeve.

9. The heating and cooling jacket defined in claim 8 wherein said intermediate metal sleeve and said inner metal sleeve at said one end of said heating and cooling jacket define an outwardly extending portion, said outwardly extending porting portion containing at least one further cooling-tube turn, said outwardly extending portion being filled with said mass of heat-conductive metal particles.

* * * * *